US006685481B2

United States Patent
Chamberlain

(10) Patent No.: US 6,685,481 B2
(45) Date of Patent: Feb. 3, 2004

(54) CARDIAC SURGICAL TRAINER AND METHOD FOR MAKING SAME

(75) Inventor: Eric R. Chamberlain, Stockbridge, MA (US)

(73) Assignee: The Chamberlain Group, Great Barrington, MA (US)

( * ) Notice: Subject to any disclaimer, the term of this patent is extended or adjusted under 35 U.S.C. 154(b) by 0 days.

(21) Appl. No.: 09/946,930

(22) Filed: Sep. 5, 2001

(65) Prior Publication Data

US 2002/0061503 A1 May 23, 2002

Related U.S. Application Data

(60) Provisional application No. 60/230,333, filed on Sep. 6, 2000.

(51) Int. Cl.⁷ .............................................. G09B 23/28
(52) U.S. Cl. ........................ 434/272; 434/262; 434/267
(58) Field of Search ................................ 434/267, 272, 434/265, 268, 262

(56) References Cited

U.S. PATENT DOCUMENTS

| | | | | |
|---|---|---|---|---|
| 1,763,467 A | * | 6/1930 | Klinker ...................... 446/198 |
| 3,562,924 A | * | 2/1971 | Baerman et al. ............ 434/265 |
| 3,562,925 A | * | 2/1971 | Baerman et al. ............ 434/265 |
| 3,568,333 A | * | 3/1971 | Clark ......................... 434/265 |
| 4,003,141 A | * | 1/1977 | Le Roy ....................... 434/270 |
| 4,811,506 A | * | 3/1989 | Mehta .......................... 40/427 |
| 5,041,973 A | * | 8/1991 | Lebron et al. ................. 703/11 |
| 5,374,194 A | * | 12/1994 | Walcerz et al. .............. 434/265 |
| 5,482,472 A | * | 1/1996 | Garoni et al. ................ 434/272 |
| 5,947,744 A | * | 9/1999 | Izzat .......................... 434/272 |
| 6,074,214 A | * | 6/2000 | Browne-Wilkinson ....... 434/272 |
| 6,234,804 B1 | * | 5/2001 | Yong .......................... 434/267 |
| 6,336,812 B1 | * | 1/2002 | Cooper et al. .............. 434/267 |

FOREIGN PATENT DOCUMENTS

| | | | | |
|---|---|---|---|---|
| DD | | 230664 A3 * | 12/1985 | ........... G09B/23/28 |
| WO | WO 0221483 A1 * | | 3/2002 | ........... G09B/23/28 |

OTHER PUBLICATIONS

"Mattapoisett woman designs heart model", South Coast Today, Jan. 15, 1999.*
Advetisment for "Heart Models" appearing on Skeleton-Models.com.*

* cited by examiner

Primary Examiner—Derris H. Banks
Assistant Examiner—Dmitry Suhol
(74) Attorney, Agent, or Firm—Gottlieb, Rackman & Reisman, P.C.

(57) ABSTRACT

A trainer for cardiac surgery and other similar procedures includes an organ model such as a cardiac model, an animation network adapted to impart to the model a motion similar to the corresponding natural organ and a control device used to control the operation of the animation network. The cardiac model is made of two sections, an inner cast simulating the myocardium and an external shell simulating the pericardium. The model is made by forming an inner cast, dressing the cast and then forming the shell around the cast. The model is preferably made of silicon rubber.

17 Claims, 8 Drawing Sheets

CARDIAC SURGICAL TRAINER AND METHOD FOR MAKING SAME

This application claims the priority filing date of U.S. Provisional Application Serial No. 60/230,333 filed on Sep. 6, 2000 and titled "A Beating Heart Surgical Trainer."

BACKGROUND OF THE INVENTION

A. Field of the Invention

The present invention relates to the field of anatomical teaching apparatus. More particularly, it relates to a cardiac surgical trainer including a heart model and means for animating the model for mimicking the heart for practicing medical procedures in a realistic but simulated manner.

B. Description of the Prior Art

Cardiovascular disease is the leading cause of death in the United States, Europe and Japan claiming more lives each year than all other diseases combined. The prevalence of this disease has resulted in the performance of numerous cardiac related medical procedures. In fact, the number of cardiac procedures including cardiac catheterization, open heart surgery, coronary artery bypass surgery, heart transplants and coronary angioplasty has steadily risen for the past ten years. While these procedures are having a beneficial effect on the medical condition of cardiac patients in general, the success of any particular cardiac procedure is linked to the training and experience of the doctors performing the operation.

Currently, the best method for a cardiac surgeon to obtain experience in performing medical procedures on the human heart, such as cardiac bypass operations, is by actually performing a procedure on a live patient under supervision of an experienced surgeon. However, for obvious reasons this is not the most desirable method for teaching surgical techniques to new surgeons. The use of a cadaver offers an alternative this training method because provides the opportunity to work on a real heart. However this approach also has many disadvantages. Working on a cadaver is unrealistic because the heart tissues are not identical to the tissues of live heart and the movement associated with contractions of the myocardium is obviously missing. Additionally, cadavers are expensive and are generally in short supply. Moreover, a cadaver can be used only for a very limited number of procedures. Finally, the handling of cadavers are often regulated by governmental agencies.

Other technological alternatives for training on real bodies were suggested but they are all deficient in that they do not adequately simulate the look, feel movement of real heart, and its tissues. For example, the patent to Yong, U.S. Pat. No. 6,234,804, teaches a model thorax with an internal cavity enclosing a replica of a heart. While the heart device is equipped to simulate bleeding or blood flow and pressurized circulation through the heart, there is no mechanism for simulating the contractions of the myocardial layer of the heart. Thus, the device does not provide a realistic tool for medical procedures intended to be performed on a beating heart. Prom, U.S. Pat. No. 6,062,866, Younker, U.S. Pat. No. 5,951,301, and Montgomery, U.S. Pat. No. 5,634,797, describe other cardiac models, however they are similarly deficient in that they fail to provide a model capable of simulating myocardial motion.

The Izzat, U.S. Pat. No. 5,947,744 discloses a device which attempts to provide "beating-heart" training. However, the device's crude implementation of a platform using a cam and variable speed motor are not appropriate for incorporation in an anatomically correct three-dimensional cardiac model made of soft tissue-like material. Moreover, the methods of pumping fluid in and out of a single chamber in a model heart or by a cam striking the surface are insufficient to provide for realistic simulation of complex myocardial motion.

OBJECTIVES AND SUMMARY OF THE INVENTION

In view of prior art deficiencies, the principal objective of the present invention is to design a cardiac trainer including an anatomically correct heart model that can be used for the training, testing or educational instruction of physicians.

It is a further objective to provide an anatomically correct heart model that is capable of movement that simulates realistically the movement of a heart.

It is a still further objective to provide for an efficient and economical method for manufacturing an accurate and realistic heart model.

Additional objectives will be apparent from the description of the invention as contained herein.

Briefly, a cardiac surgical trainer constructed in accordance with this invention includes a heart model consisting of two portions: an inner cast simulating the myocardium and an outer shell corresponding to the epicardium. Both portions are made of a flexible material such as silicone rubber and are painted to look as close as possible to a human heart, using for example, silicone based paints.

The heart model is made using a two stage process. In a first stage sculptures are made corresponding to the inner and outer surfaces of the myocardium. The sculptures are used to make molds for the inner cast. Next, a separate mold is made corresponding to the whole heart and the inner cast is introduced into the separate mold to allow the shell to be molded thereon.

Preferably, the model is animated so through an animation network and a control device. The animation network consists of tubes imbedded in the heart model and coiled around orthogonal axes. The control device changes the pressure within the tubes in a controlled manner so as to impart to the heart model a multi-dimensional rotational motion similar to a beating heart. In one embodiment, the tubes are made so that they contract longitudinally when they expand radially.

In one embodiment, the heart may then be incorporated into a model thorax with a pericardial well to hold the model heart, which is accessible through a sternotomy opening. The thorax may also be made with anatomically correct ribs, intercostal spaces and artificial skin to yield a life-like operating center. The thorax may be sized to fit within a suitcase type holder for portability.

With this device, surgeons, surgical students and other medical professionals may be trained in procedures and the use of medical devices for off-pump non-arrested heart surgery. By way of example, possible training applications include full open heart procedures, endoscopic procedure, robotic procedures, heart bypass, heart stabilization, left anterior mammary artery (LIMA) and right anterior mammary artery (RIMA) dissection, pericardial suturing, endoscopic port selection and placement. The device may be used to teach other cardiac procedures or to develop new procedures.

DETAILED DESCRIPTION OF THE INVENTION

Figure 1:
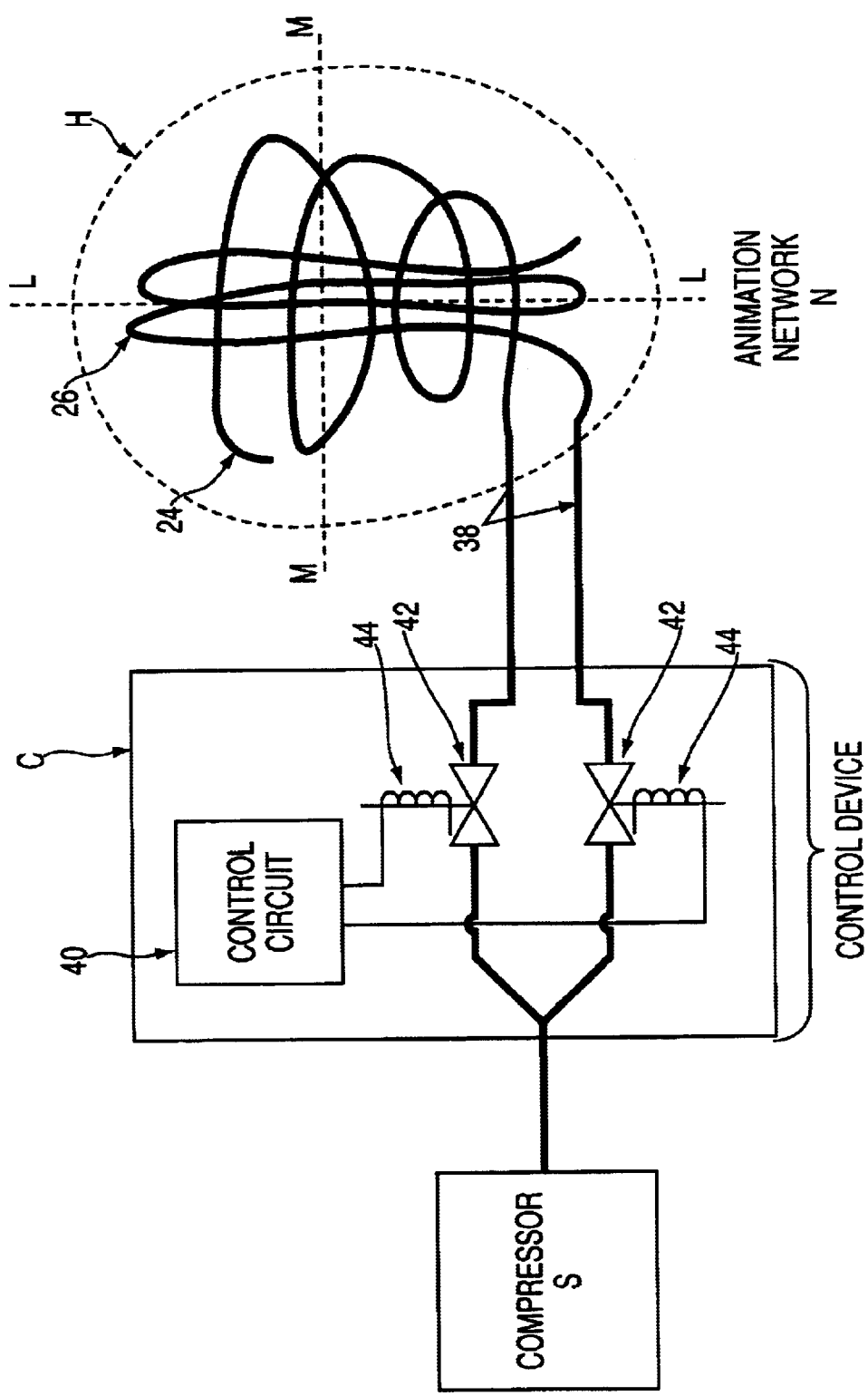
FIG. 1 shows a block diagram of a cardiac surgical trainer constructed in accordance with this invention, including an anatomically correct heart model.

Referring now to the Figures, and more particularly FIG. 1, the main components of a cardiac trainer T constructed in accordance with this invention include a heart model H(shown in outline) having a longitudinal axis L—L, animating network N, a control device C and a source of compressed air S.

Figure 2:
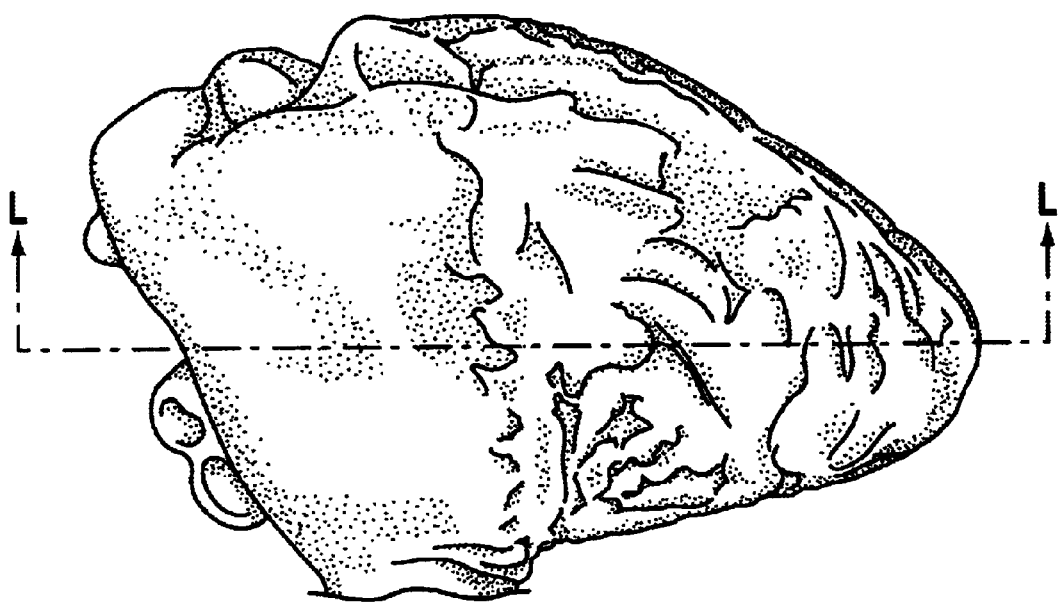
FIG. 2 shows a right elevational view of the heart model for the trainer of FIG. 1.
Figure 2A:
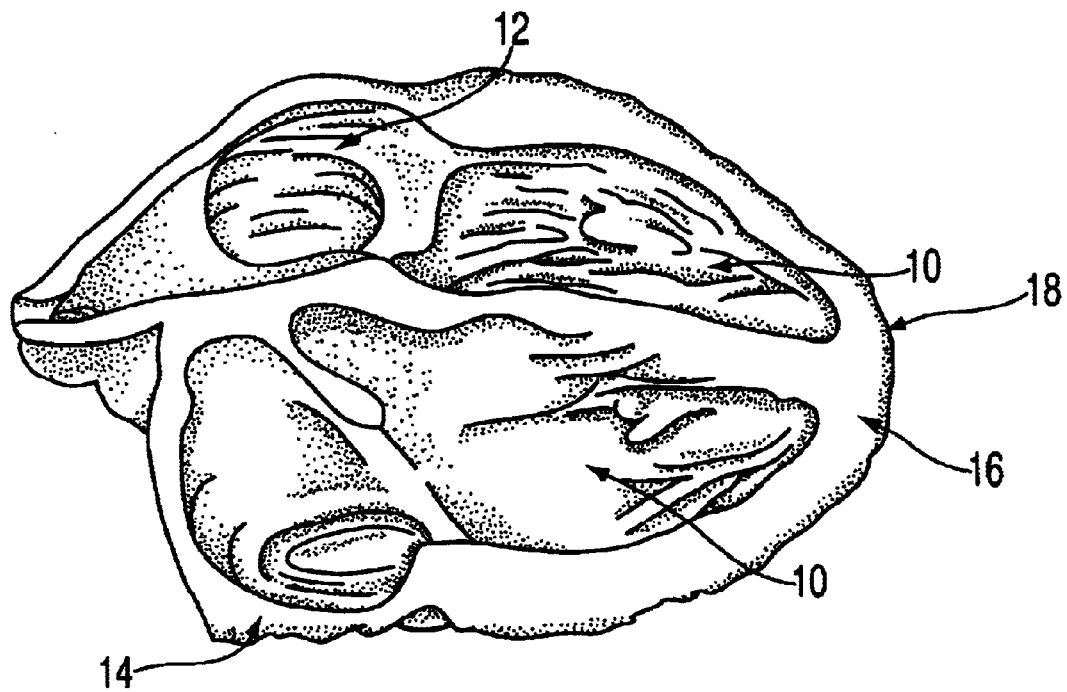
FIG. 2A shows a cross sectional view of heart model of FIG. 2 taken along lines L—L.
Figure 2B:
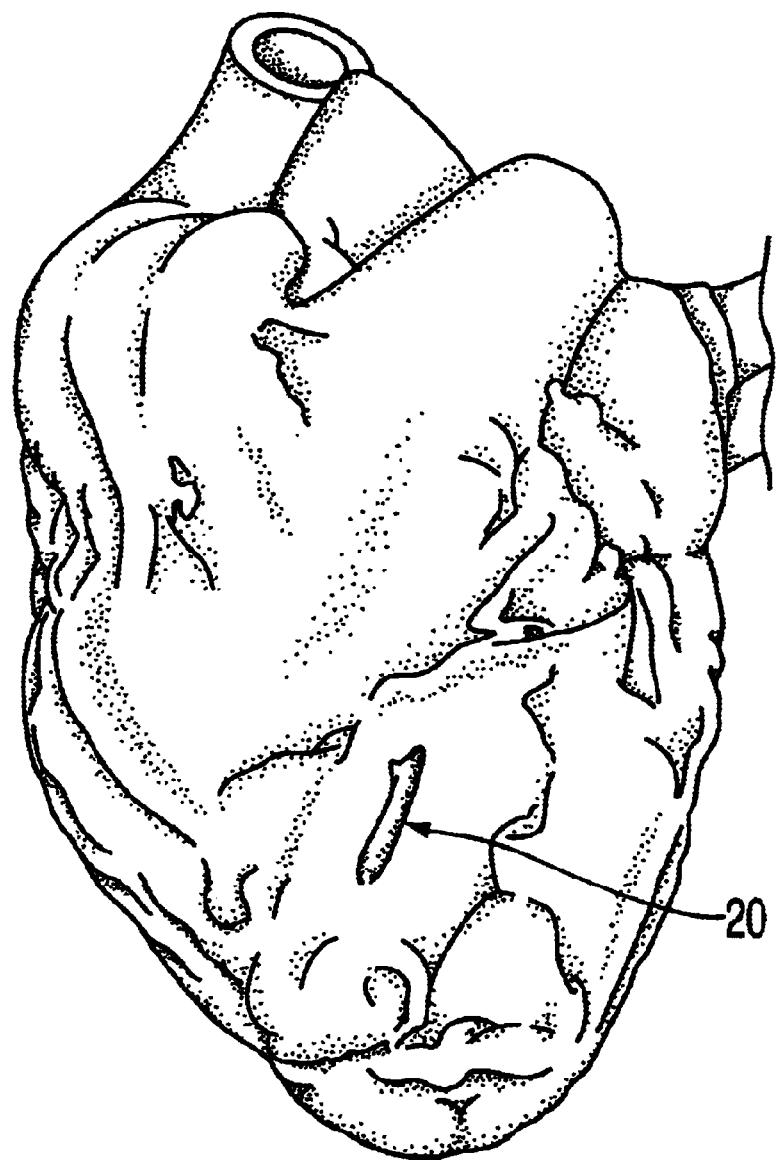
FIG. 2B shows an anterior view of the heart model including a silicone tube.

As shown in FIGS. 2, 2A, 2B the heart model H, is constructed and arranged to conform in anatomical details to an actual human heart. The heart model H may be made with different sizes, shapes, colors, etc. to simulate an adult or a pediatric heart. Moreover heart model H may also simulate either a healthy or a diseased heart, as required. Preferably, the heart model H is hollow. In one embodiment of the invention, the heart model H is formed with cavities 10, 12 that simulate respectively the right and the left atrium and ventricle. Optionally, these chambers 10, 12 may include valves or non-functioning elements simulating heart valves (not shown). In this embodiment the heart model H is not animated.

In another embodiment, the heart model H is formed with altered-shaped cavities to hold the animation network N. In either embodiment, the cavities 10, 12 of the heart model H are accessible through holes 14 simulating connections to the circulatory veins and arteries. As discussed in more detail below, advantageously, the holes 14 may be used to supply compressed air to the animation network N.

As seen in the FIGS. 2, 2A, 2B the heart model H consists of two components, an inner cast 16 which simulates the cardiac muscles or myocardium and an outer shell 18 that simulates the epicardium. Both members 16 and 18 are made of silicone. The inner cast 16 typically has a thickness of about 3/16 to 3/8" and the shell 18 has a thickness of about 1/16 to 3/16". Preferably, at certain predetermined locations, silicone tubes 20 having a diameter of about 1/8" and a length of 1.5" are attached to the heart model H to simulate arteries. These tubes may be filled with a red colored liquid to simulate blood.

Figure 3:
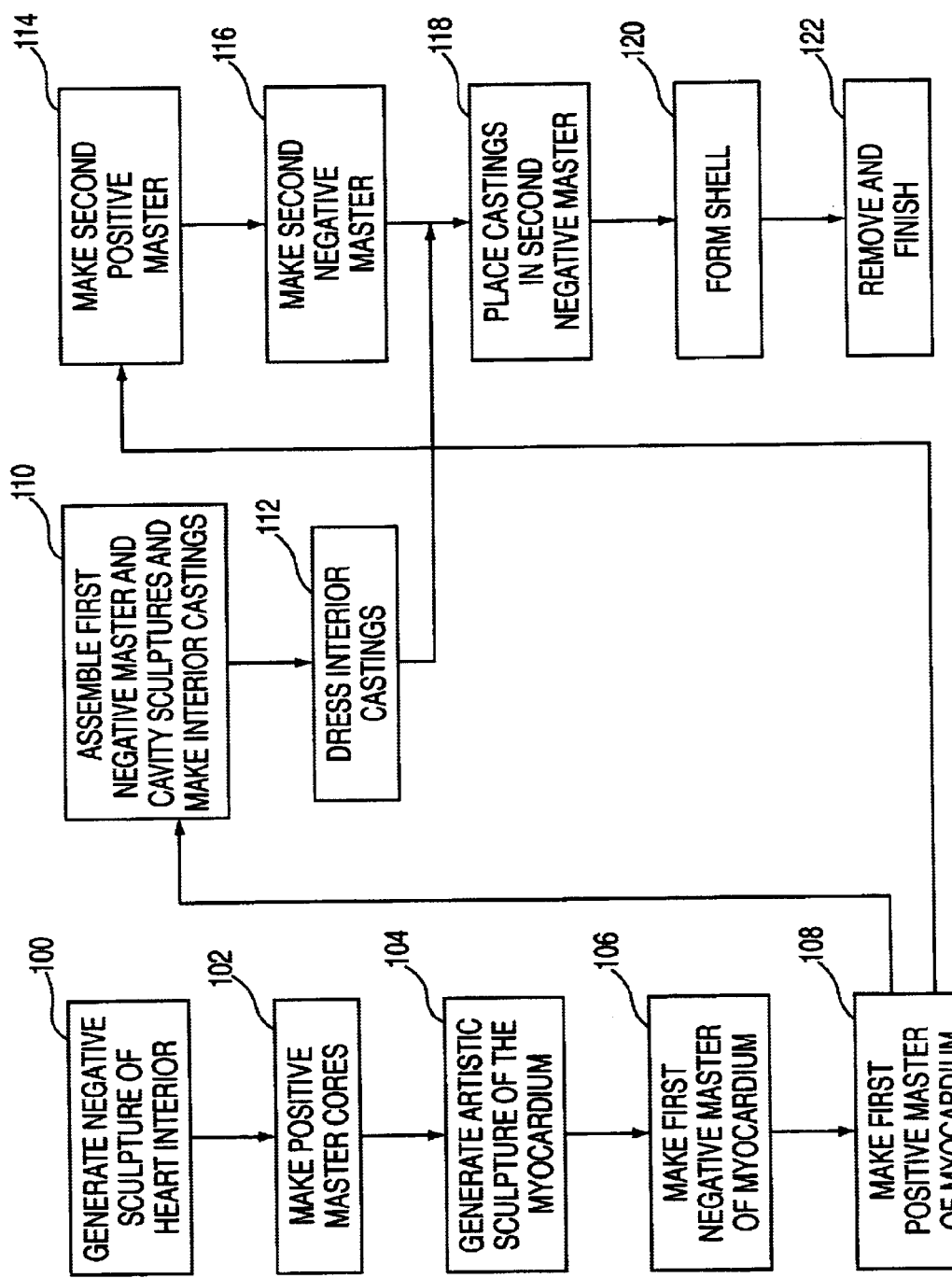
FIG. 3 shows a flow chart illustrating the method used to make the heart model of FIGS. 2 and 2A.

The flow chart of FIG. 3 depicts a method for fabricating the heart H in accordance with the invention.

In the first step 100 a block of wax having the approximate size and shape of the myocardium is carved to create hollow cavities that define the interior spaces of the heart. In step 102 a casting medium such as a rigid urethane is poured into the block of wax to create two positive master cores.

Next, in step 104 the exterior of the block of wax is sculpted to define the final shape and size of the desired myocardium. In step 106 a first negative master mold is made that corresponds to the original exterior sculpture using standard molding techniques. When the wax is removed from the mold, the elements that remain are the negative master mold 62 for the myocardium (See FIG. 5); and the two positive master cores (such as cores 60, in FIG. 5) that define the cavities 10, 12 of the heart. The two positive master cores have convoluted interlocking shapes and are registered by alignment sockets (not shown) to the master negative mold. In step 108 the cores are removed from the negative master mold and a solid positive master of the myocardium layer exterior is created. The solid positive master is also made of a rigid urethane.

In step 110 the registered cores are returned to the alignment sockets in the negative master and a plurality of interior castings are made by pouring liquid silicone rubber into the mold and letting it set.

In step 112 each casting is dressed by applying paint to its outer surface so that it resembles the myocardium. It was found that silicone-based paints provide superior results for this purpose. In some cases, some extra tissues may also be simulated by adding dabs of silicone on the castings with a spatula. After the castings are dressed, they are allowed to dry for about four hours. Each casting thus dressed forms a corresponding inner cast 16.

In step 114 clay or other suitable material is added to the first positive master thereby forming a second positive master having substantially the shape and size of the final heart model H. That is, the clay added to the first positive master in this step defines the shape and size of the outer shell 18. In step 116 a second negative master is formed from the second positive master.

In step 118 the castings from step 112 are placed into the second negative master to form a second mold. In step 120 a substantially transparent or translucent silicon rubber is poured into the second mold to form shell 18 around inner cast 16. After the shell is set, in step 122 each casting is removed from the mold and cut open. The cores defining cavities 10, 12 are removed through the cuts and the castings are then closed and sealed by applying silicone rubber into the cut. The resulting assembly is finished to form the heart model H. As part of this finishing step, a shiny clear coat of silicone is applied to the outer surface, for example by applying a light spray.

The resulting heart model H has glistening, wet look and feel that is very realistic. This heart model may be used as a teaching tool by itself. If it is provided with the vessels 20, the heart module may be used as a means of practicing on these vessels as well.

In order to provide even more realism, the heart model H can be animated by installing an animation network N. The animation network N is constructed from a plurality of pneumatic tubes arranged so that they change dimension when actuated by a gas (typically, air) under pressure. More specifically, the tubes are arranged so that when the network N is activated, the tubes contract and expand sequentially in a manner so as to cause the heart module to twist about two perpendicular axes at a predetermined rate resulting in a three-dimensional twisting motion that simulates the motion of an actual heart.

As shown in FIG. 1, the network N includes two tubes. The first tube 24 is arranged in a spiral pattern with loops arranged around longitudinal axis L—L. The second tube 26 is arranged in loops oriented around axis M—M perpendicular to longitudinal axis L—L of the heart model H.

Figure 4:
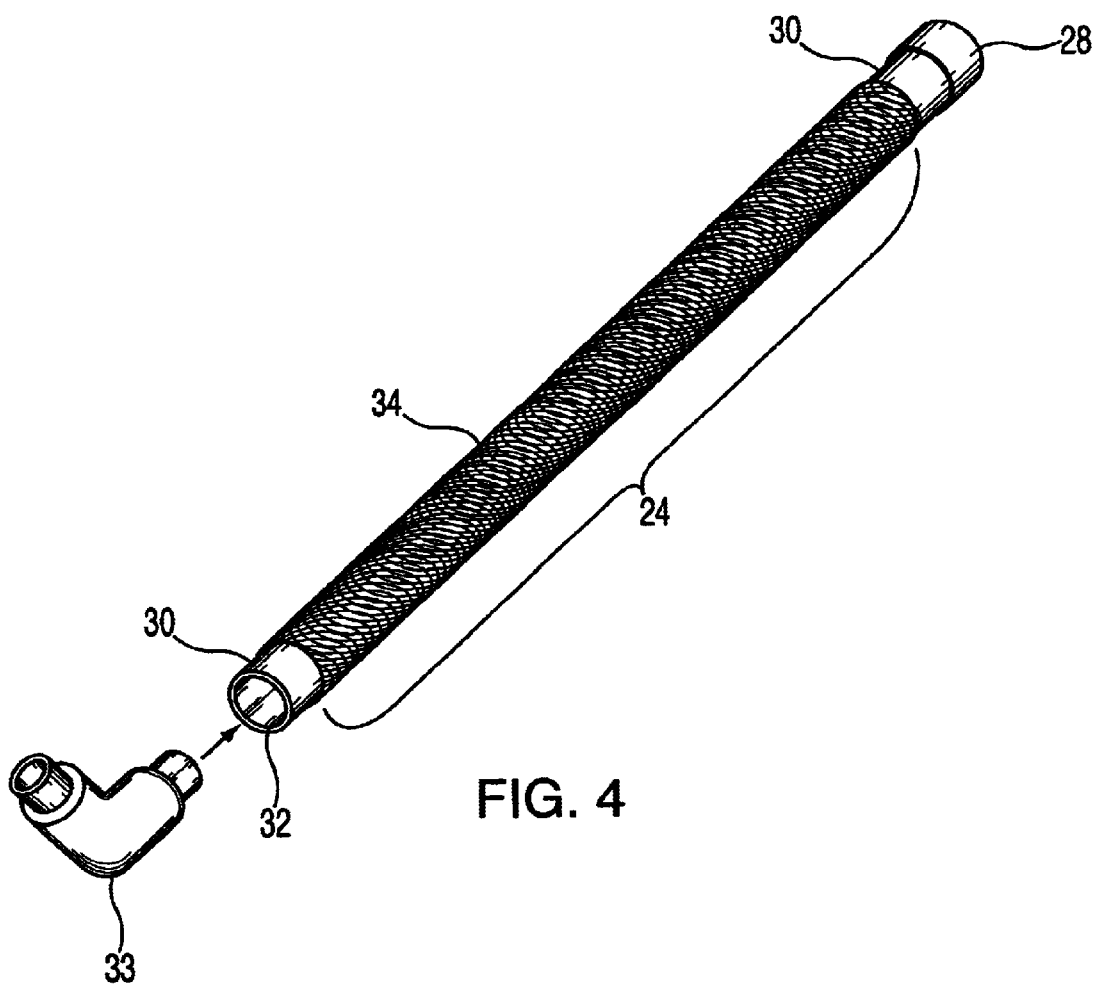
FIG. 4 shows a tube used in the animation network of FIG. 1.

FIG. 4 shows details of tube 24, it being understood that except for its length, tube 26 has the same construction. Tube 24 is formed of a thin flexible plastic pipe 32 and a woven mesh 34. Both the pipe 32 and mesh 34 are radially expandable. One end of the tubes is sealed as at 28 while the other end is open to receive the coupling 33 arranged to provide air under pressure as discussed below. Importantly adjacent to each of the ends of the tube, the mesh 34 is attached to the pipe 32 by an adhesive, by ties or other similar means.

In this configuration, the mesh 34 and pipe 32 are arranged so that when the respective tube is pressurized, the radial expansion of the pipe 32 causes the mesh 34 to expand radially as well, however, because of the attachment between the pipe and the mesh at 30, the mesh forces the pipe 32 to contract axially. The meshes may be made of nylon or polyester. The pipes may be made of latex and have a outer diameter of 1/8–3/8".

Figure 5:
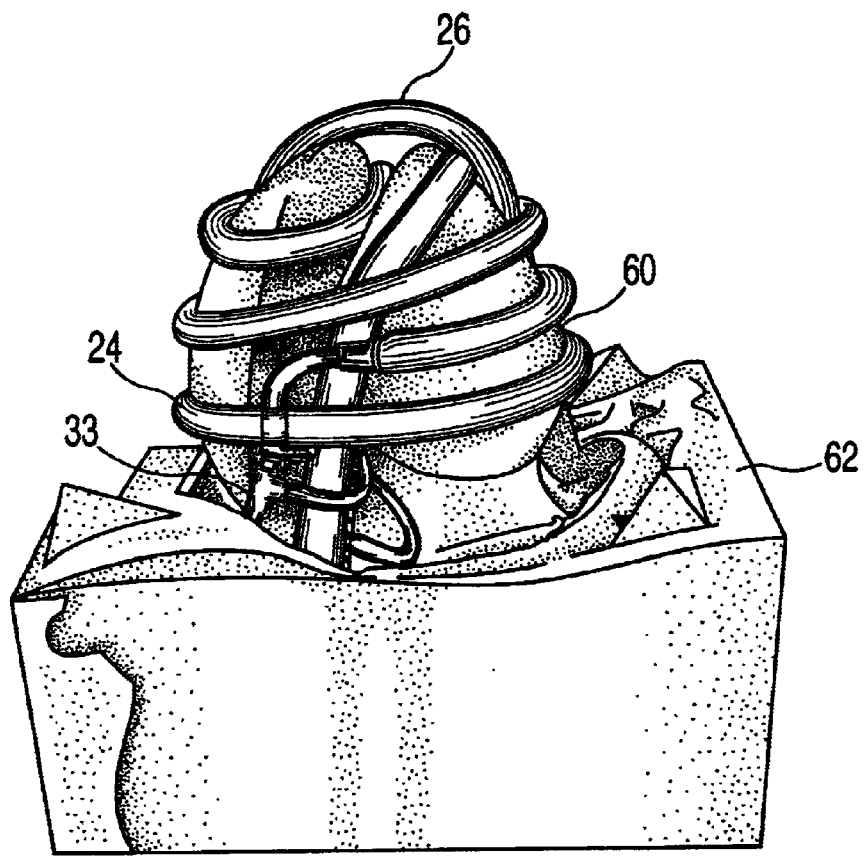
FIG. 5 shows an elevational view of the first negative mold with a cavity sculpture and the tubes of the animation network.

While various configurations can be used for providing the animation network, the preferred embodiment is shown in FIG. 1. The open end 32 of each tube 24, 26 is connected by a respective extension 38 for attachment to control device C. The tubes are inserted in the heart model H as follows. As mentioned above, one of the steps of the process of making the heart model H is the making of cavity sculptures (step 102, FIG. 3). As part of this step, the cavity sculptures 60 shown in FIG. 5 are provided with grooves (not shown) that define the desired shapes for the tubes 24, 26. After the cavity sculptures or cores are completed, the tubes 24, 26 are wound around the cavity sculpture 60. Then, when the cores are positioned in the first negative master 62 (step 110), the tubes 24, 26 are automatically properly oriented and positioned so that when the interior casting is formed, it envelopes the tubes 24, 26. As seen in FIG. 5, a substantial portion of the tubes 24, 26 extends beyond the cores 60. As a result, when each interior casting is over between the cores 60 and the first negative master, the tubes 24, 26 are firmly embedded in the casting and, eventually in the cast 16.

Figure 6:
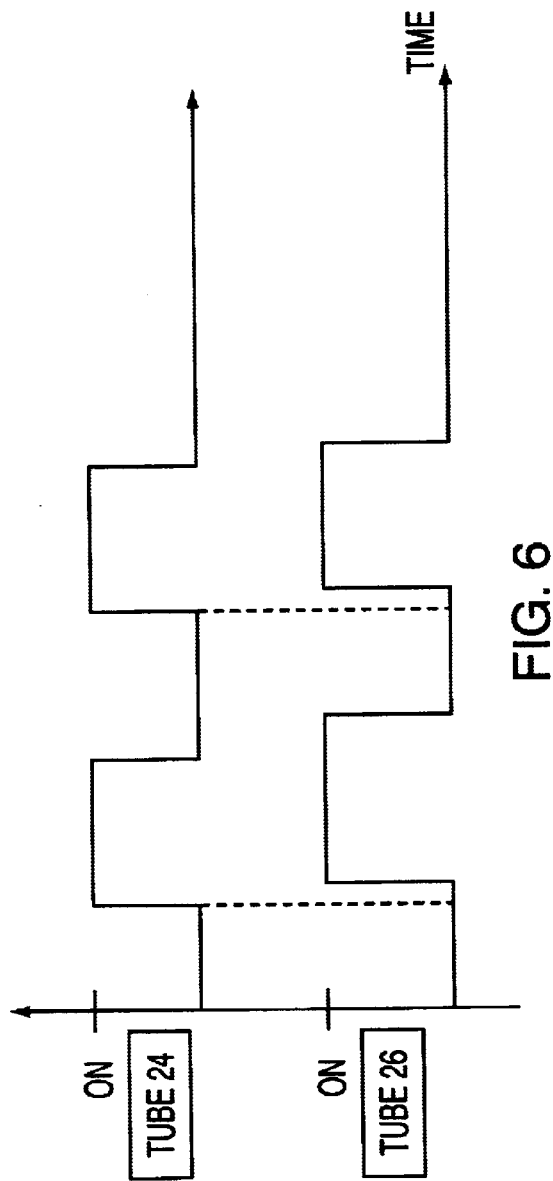
FIG. 6 shows a timing diagram illustrating the pressurizing of the two tubes.

Returning to FIG. 1, the control device C includes a control circuit 40, two automatic valves 42 (one for each tube 24, 26) operated by the control circuit 40 through respective solenoids 44 and a rate selector 41 that can be used by an operator to select a 'beat' rate for the heart model H. The control circuit 40 provides the means for controlling the selectively the air flow into the tubes 24, 26, from compressor S. The control circuit 40 may be a microprocessor, for example a Basic Stamp II by Parallax, Inc. The microprocessor is programmed to open and close the valves in a predetermined sequence to selectively pressurize tubes 24, 26. For example, as shown in FIG. 6, the tubes 24, 26 may be pressurized in a sequence, as shown, at regular intervals, dependent on the rate selected by the user on a rate selector 41. Preferably, the tube 26 is pressurized first, and tube 24 is pressurized about 100–150 msec later, as illustrated in FIG. 6. It was found that with this arrangement the heart module H is imparted a three-dimensional rocking motion very similar to the motion of a live, beating heart. Those skilled in the field will recognize that other means of imparting motion to the heart module H may be used as well. For example, a liquid may be used instead of air to selectively pressurize the tubes 24, 26.

Moreover, while in the embodiment shown a closed system is used, a circulatory system may also be provided in which the blood flow through the heart module H is also mimicked.

Figure 7:
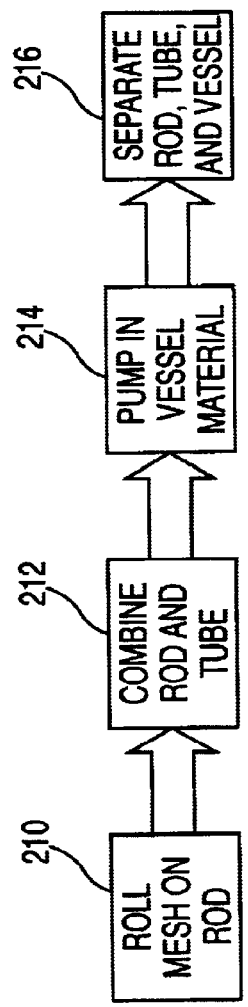
FIG. 7 shows flow chart for making tubes imitating blood vessels.

As mentioned above, the heart module H may be provided with one or more blood vessels 20. A method for making these blood vessels 20 is now described in conjunction with the flow chart of FIG. 7. In step 210, a metal rod that approximates the inside diameter of a particular vessel is provided and covered with a nylon mesh. Preferably the nylon mesh is rolled around the rod. The rod is then inserted into a tube having an inner diameter that is slightly larger than the rod and mesh in step 212 to approximate a desired thickness. Silicone or urethane modeling material is pumped into the tube and around the rod in step 214 at about 100 psi.

The model vessel thus obtained has the look and feel of a real vessel. The mesh provides reinforcement to hold sutures for simulating a medical procedure where suturing is required. The selection of materials and the narrow width also permit the vessel to simulate the collapse of a real vessel. They may be attached to other body organs, such as the heart or a thorax, by tying off an end with a guide string and threading the guide string through a hole in the organ. The guide string may then be removed after using it to pull the vessel into the organ.

The vessels 20 may be used to practice coronary artery anastomosis while the heart model H is 'beating.'

Figure 8:
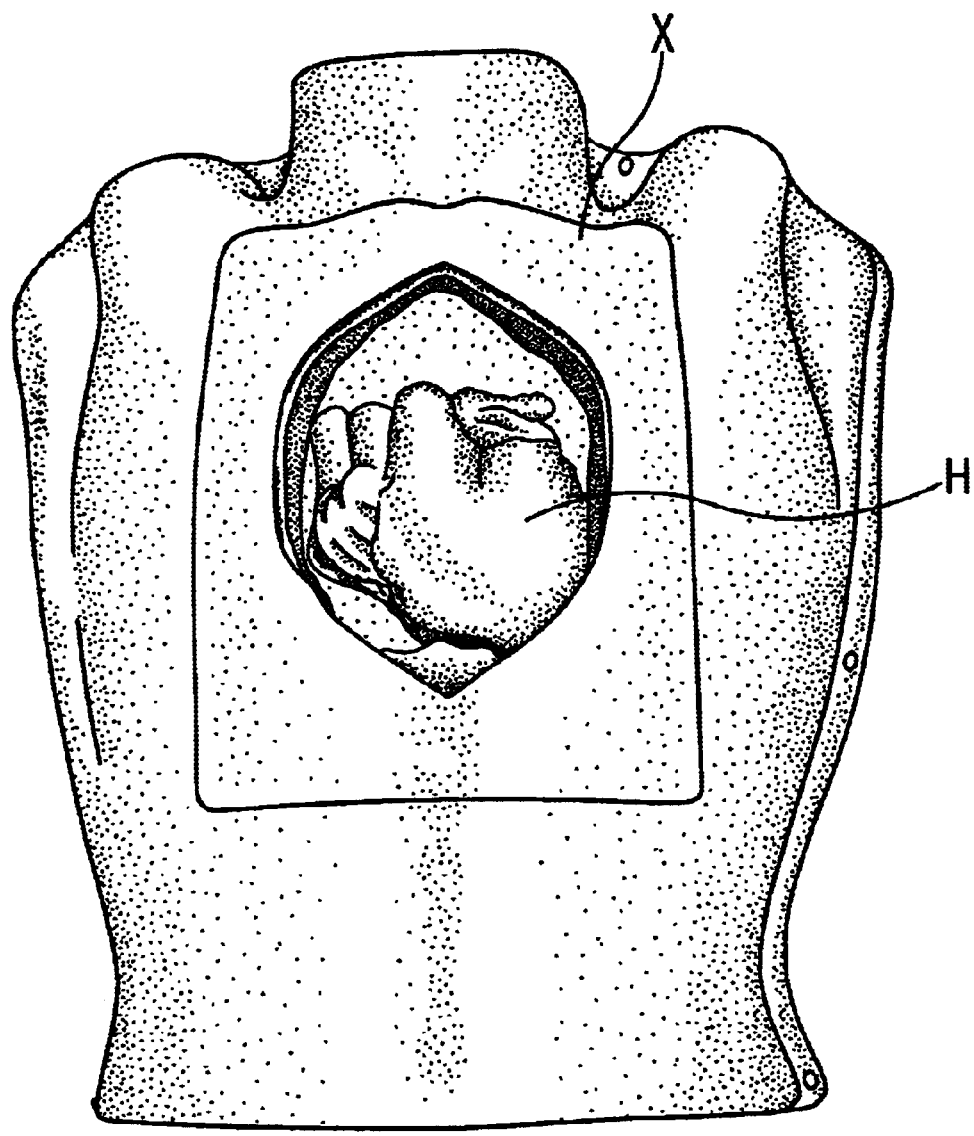
FIG. 8 shows the heart model constructed in accordance with this invention and disposed in an artificial thorax.

As shown in FIG. 8, upon completion, the heart model H may be placed within a replica thorax X. The thorax is preferably an typical-sized adult male chest intended to represent a patient lying on his back form the neck to diaphragm and shoulder to shoulder. It is mounted to a flat base meant to sit on a tabletop. The thorax may be provided with openings or incisions such as a sternotomy, partial or full, inset with a soft casting to represent the sternotomy opening. Additional openings or incisions, might include thoracotomy opening or endoscopic ports. At the edge of the sternotomy is a pericardial-like well, which serves as a sling for the heart H. The well is lined with a soft, flexible reinforced pericardium-like material. The thorax X may also contain LIMA and RIMA pedicles tucked under the edges of the sternotomy that contain left or right internal mamary arteries and veins that are capable of being dissected from the thorax X. The thorax X may also serve to conceal the control device C in its base.

The thorax X may be augmented with other components as well. One alternative has full artificial skin. Another thorax X has artificial ribs and intercostals spaces which permit rib retraction. The thorax X may be simplified to permit a dimension that allows it to be placed in a portable suitcase container.

Although the invention has been described with reference to various embodiments, it is to be understood that these embodiments are merely illustrative of an application of the principles of the invention. Numerous modifications, in addition to the illustrative embodiments of the invention discussed herein may be made and other arrangements may be devised without departing from the spirit and scope of the invention. For example, it will be readily apparent to one skilled in the art that the disclosed methods may be used to replicate biological organs other than the heart. Similarly, alternative means for generating muscle-like motion in a motion distribution network in an encapsulated layer of a model will also be apparent. Moreover, the control device C can be disposed inside the heart model as well thereby reducing the overall size and complexity of the subject cardiac surgical trainer.

I claim:

1. A cardiac trainer comprising:
   a heart model made of a relatively soft material and having a size and shape of a heart;

an animation network disposed in said heart model and arranged to twist said heart model about two perpendicular axes at a predetermined rate resulting in a three dimensional twisting motion that simulates the motion of the heart and a control device connected to said animation network to selectively activate said animation network.

2. The trainer of claim 1 wherein said animation network includes a plurality of tubes oriented along said axes.

3. The trainer of claim 2 wherein said tubes are arranged to change a dimension when pressurized.

4. The trainer of claim 3 wherein said tubes change in length when pressurized.

5. The trainer of claim 4 wherein each tube comprises a flexible pipe having two ends and a mesh attached to the ends of the pipe, wherein said pipe and mesh expand radially when said pipe is pressurized, and wherein said mesh forces said pipe to shorten longitudinally when said pipe is pressurized.

6. The trainer of claim 2 comprising of two tubes arranged along said perpendicular axes.

7. The trainer of claim 1 further comprising a rate selector operable by a user to select a rate at which said heart model is moving.

8. The trainer of claim 1 further comprising a thorax model, said heart model being disposed in said thorax model.

9. A teaching device comprising:

a heart model made of a relatively soft material and being shaped to resemble a heart;

an animation network disposed in said heart model and arranged to twist of said heart model about two perpendicular axes at a predetermined rate resulting in a three dimensional twisting motion that simulates the motion of the heart said animation network including a first tube; and a control device connected to said animation network to selectively activate said animation network by selectively pressurizing said tube to change the length of said first tube.

10. The trainer of claim 9 wherein said animation network includes a second tube selectively pressurized by said control device, said first and second tubes being selectively pressurized to create a first motion of the model in a first direction and a second tube arranged to create a second motion of the model in a second direction.

11. The trainer of claim 10 wherein said first and second tubes are arranged along said perpendicular axes.

12. The trainer of claim 9 further comprising a rate selector operable by a user to select a rate at which said heart model is moving.

13. A teaching device comprising:

a heart model made of a relatively soft material and being shaped to resemble a heart;

an animation network disposed in said heart model and arranged to move said heart model in a manner so as to twist of said heart model about two perpendicular axes at a predetermined rate resulting in a twisting motion that simulates the motion of the organ, said animation network including a first tube formed of a flexible pipe having two ends and a mesh attached to the ends of the pipe, wherein said pipe and mesh expand radially to shorten said pipe longitudinally when said first tube is pressurized; and a control device connected to said animation network to selectively activate said animation network by selectively pressurizing said tube to change the length of said first tube.

14. An anatomical trainer for a biological organ having muscle-like motion for use as a training device in simulated medical procedures comprising:

an organ model part having anatomical details of a biological organ;

an animation network coupled to said organ model; and a control device connected to said animation network to operate said animation network in a manner that induces a twist of said organ model about two perpendicular axes at a predetermined rate resulting in a three-dimensional twisting motion that simulates the motion of the biological organ.

15. The trainer of claim 14 wherein said animation network includes two tubes and wherein said control device is operable to change pressures within said tube in a synchronized manner calculated to impart said twisting motion to said organ model.

16. The trainer of claim 14 further including a tube wherein said tube includes a flexible pipe that can expand radially when pressurized and a mesh attached to the pipe and arranged to shorten the pipe when the pipe is expanded.

17. The trainer of claim 14 wherein said wherein animation network is powered by compressed gas, further comprising a compressor adapted to supply said compressed gas.

* * * * *